United States Patent [19]

Bamberger et al.

[11] 4,455,091
[45] Jun. 19, 1984

[54] PROCESS FOR REGULATING THE MIXING PROCESS OF RUBBER MIXTURES IN AN INTERNAL MIXER

[75] Inventors: Wolfgang Bamberger, Gerlingen; Werner Wiedmann, Stuttgart, both of Fed. Rep. of Germany

[73] Assignee: Werner & Pfleiderer, Stuttgart, Fed. Rep. of Germany

[21] Appl. No.: 297,365

[22] Filed: Aug. 28, 1981

[30] Foreign Application Priority Data

Sep. 19, 1980 [DE] Fed. Rep. of Germany ....... 3035353

[51] Int. Cl.$^3$ ............................ B01F 7/08; B29B 1/10
[52] U.S. Cl. ........................................ 366/76; 366/77; 366/81; 366/83; 366/601
[58] Field of Search .............................. 366/69, 75–81, 366/83–90, 96–99, 144, 145, 297–301, 318, 319, 601; 425/201, 204, 209, 200

[56] References Cited

U.S. PATENT DOCUMENTS 3,447,201  6/1969  Seanor et al.
4,058,297 11/1977  Seufert .................................. 366/81
4,234,259 11/1980  Wiedmann et al. .................. 366/81

FOREIGN PATENT DOCUMENTS 2058975  3/1974  Fed. Rep. of Germany .

OTHER PUBLICATIONS

Journal Kautschuk-und Gummikunststoffe, 1971, No. 3, pp. 119 to 127.
Journal Gummi Asbest Kunststoffe, 7/78, 31, pp. 512–515.

Primary Examiner—Timothy P. Simone
Attorney, Agent, or Firm—Browdy and Neimark

[57] ABSTRACT

A process for regulating the mixing process of rubber mixtures utilizes an internal or closed mixer having a casing containing two paddles with feed and mixing blades mounted on shafts which extend with parallel axes through a mixing chamber. The shafts are arranged to be driven in opposite directions at variable speeds and the mixer is provided with a pressure-operable plunger for closing the mixing chamber. The temperature of the mixing process is controlled with the aid of a thermometer probe and the mixing sequence is controlled on the basis of energy marks and a superimposed desired/actual value follower control of the mixing temperature via the specific energy supplied to the mixture in the mixing chamber, the speed at which the shafts and hence the paddles are driven and/or the pressure applied by the plunger serving as variables for the temperature control.

4 Claims, 4 Drawing Figures

PROCESS FOR REGULATING THE MIXING PROCESS OF RUBBER MIXTURES IN AN INTERNAL MIXER

FIELD OF THE INVENTION

This invention relates to a process for regulating the mixing process of rubber mixtures in an internal or closed mixer. Such internal or closed mixers are known from U.S. Pat. No. 4,234,259.

BACKGROUND OF THE INVENTION

For maintaining constant the mixing temperature and/or motor torque on an internal mixer it is known from U.S. Pat. Specification No. 3,447,201 that although both quantities are determined, only the sum of the variations from a predetermined value is converted into a speed change of the drive, both quantities being simultaneously increased or decreased accordingly. This known process has the disadvantage that the two variations cannot be individually minimized.

It is known from German Auslegeschrift No. 20 58 975 to bring about a control of the electrical power of the motor by means of changes to the plunger pressure. However, this control does not lead to constant quality between the individual charges and instead the permitted power is adapted to partial cycles of the mixing process for carbon black or oil addition.

It is known from the Journal KAUTSCHUK UND GUMMIKUNSTSTOFFE, 1971, no. 3, pp. 119 to 127 to bring about a control on the basis of reaction-kinetic data determined from the temperature gradient by means of process computers, the calculation being based on a temperature gradient over a period of time determined by a basic test. The disadvantage of this process is that it is only suitable for checking chemical reactions.

It is known from the Journal Gummi Asbest Kunstatoffe 7/78, 31, pp. 512–515 to carry out a control on the basis of the specific energy. This control has the disadvantage that through maintaining constant this single quantity, variations of other process parameters are increased.

SUMMARY OF THE INVENTION

Disturbance variables during a mixing process include fluctuations in the machine temperature, the cooling water temperature, the material feed temperature, the plunger pressure, the speed or the filling level. These disturbance variables have a significant influence on the process and quality parameters in the form of the ejection temperature (careful mixing), filler dispersion (tensile testing), viscosity (shear test), elasticity (workability), homogeneity (mixing quality), time (economic aspect) and percentage reaction (chemical chain degradation, reliability of cross-linking).

An aim of the present invention is to so develop a process of the aforementioned type that the quality-impairing influences of disturbances variables are reduced to a minimum.

According to the invention, there is provided a process for regulating the mixing process of rubber mixtures in an internal or closed mixer, having two paddles with feed and mixing blades arranged with their axes parallel in a mixing chamber and which can be driven to opposite directions at variable speeds. The mixer is provided with a pressure-operable plunger for closing the mixing chamber. The temperature of the mixing process is controlled, and the mixing sequence is controlled on the basis of energy marks and a superimposed desired/actual value follower control of the mixing temperature via the specified energy supplied to the mixture, the paddle speed and/or the plunger pressure serving as manipulated variables for the temperature.

It has surprisingly been found that through a combination of a control by energy marks and a superimposed temperature follower control in which the mixing temperature is predetermined as a desired value pattern as a function of the specific energy supplied to the mixture, the most important quality-determining parameters, namely the supplied specific energy and the temperature, can be kept constant between the individual charges during a mixing process. To a significant extent it is possible to eliminate the otherwise constantly occurring differences in the mixing qualities in the first charges on starting with a cold machine and during subsequent operation, as well as between summer and winter operation, as well as due to the other disturbance variables referred to hereinbefore.

Such a combined control and regulation process can be performed by means of microcomputers, to which it is possible to supply the control marks and the desired temperature gradient via the specific energy supplied in a random known manner.

BRIEF DESCRIPTION OF THE DRAWINGS

The invention will now be described in greater detail, by way of example, with reference to a non-limitative embodiment shown in the drawings, in which.

DETAILED DESCRIPTION OF THE PREFERRED EMBODIMENT

Figure 1:
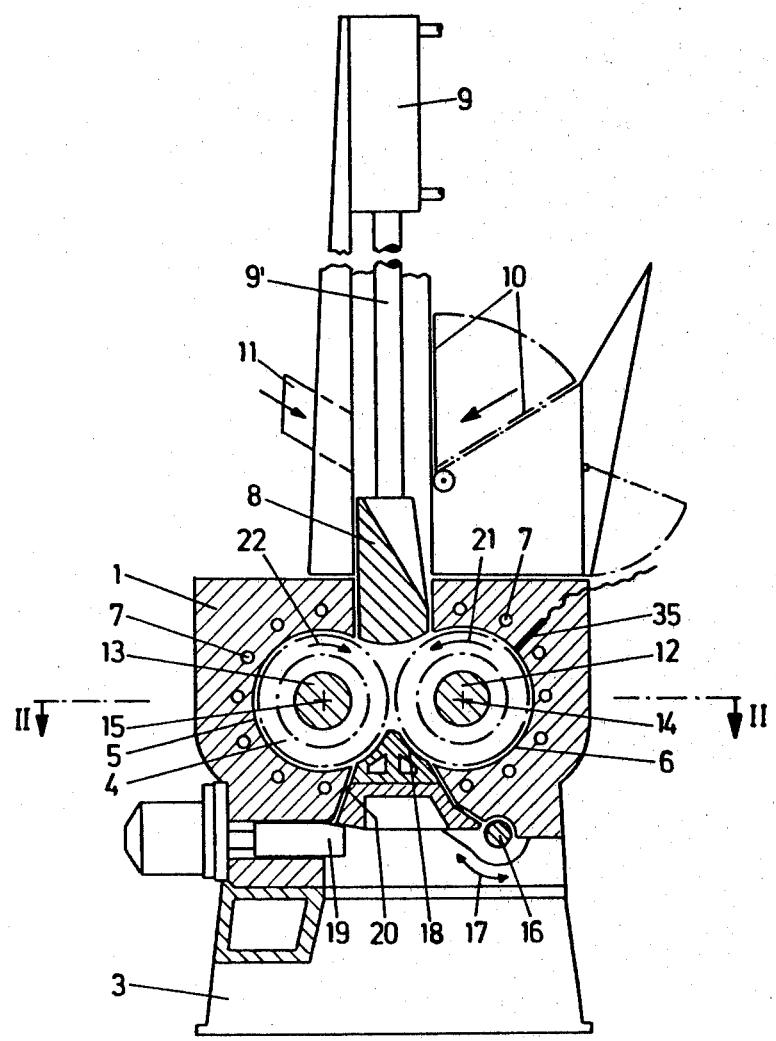
FIG. 1 is a vertical section through an internal mixer.
Figure 2:
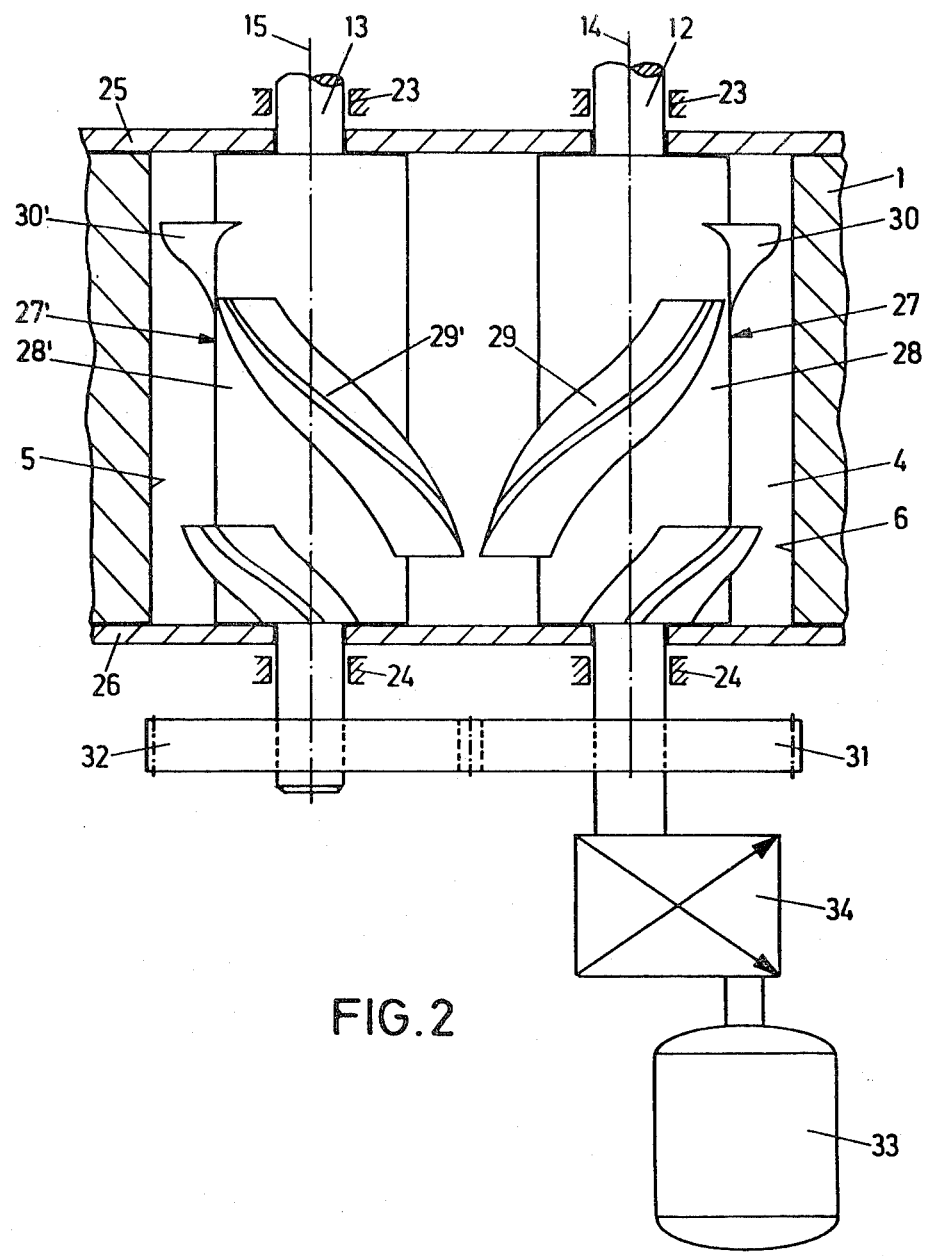
FIG. 2 is a cross-section through the internal mixer taken on the line II—II in FIG. 1.

The per se known internal mixer suitable for a control according to the invention, shown in FIGS. 1 and 2, has a casing 1, resting on a column 3. The casing 1 contains a mixing chamber 4, whose walls 5, 6 have the shape of two axially parallel, horizontal cylinders, which are contiguous with one another or to a limited extent penetrate one another.

In the vicinity of the walls 5, 6 of the mixing chamber 4, the casing 1 contains cooling as passages 7. Material to be mixed can be supplied from above under pressure to the mixing chamber 4 by means of a plunger 8 operable by means of a hydraulic working cylinder 9 and a piston rod 9'. When the plunger is raised the material for mixing, e.g. raw rubber, is fed in by a feed flap 10 pivoted into an open position for this purpose and which is shown by broken lines. The pulverulent components, particularly additives, can be incorporated into the base material by means of a further feed opening 11.

Shafts 12, 13 are arranged concentrically to a respective wall 5 or 6 in the mixing chamber 4 in such a way that their axes 14, 15 are horizontal and parallel to one another. They coincide with the two axes of the cylinders forming the walls 5 and 6. Kneading paddles or rotors, which are only intimated in FIG. 1 and thereof a possible constructional embodiment as shown in FIG. 2, are fitted to the shafts 12, 13.

The lower saddle of the mixing chamber 4 is constructed as a hinged saddle 18 which can be pivoted away and downwards about a spindle 16 following arrow 17 and which is held in the raised operating position by means of a hydraulically operable locking device 19. A lower opening 20 which is kept closed during operation (see FIG. 1) by the hinged saddle 18 is used for emptying the mixing chamber 4 after the mixing and kneading process.

The shafts 12, 13 are driven in opposite directions in accordance with the directions of rotation indicated by the curved arrows 21, 22. For this purpose, the shafts 12, 13 are in each case mounted in a rotary manner in bearings 23, 24 fitted to end walls 25, 26 which terminate the mixing chamber 4.

A mixing and kneading paddle 27 or 27' is connected to the particular shaft 12, 13 and has a cylindrical paddle core 28 or 28', to which are fitted two main, feed and mixing blades 29, 30 or 29', 30'.

The blades 29, 30 on the paddle core 28 and the blades 29', 30' on the other paddle core 28' are arranged in such a way that in each case the blades 29, 29' or 30, 30' form a pair rotating so as to be tangential to one another. However, they may also be constructed in per se known manner so as to engage in one another.

The hitherto represented and described internal or closed mixer is, for example, known from U.S. Pat. No. 4,234,259 to which reference should be made for further details, and the contents of which are hereby incorporated by reference.

A gear 31, 32 is fixed in non-rotary manner to each of the shafts 12, 13 and the two gears mesh with one another. The drive is provided by means of an electric motor 33 via an infinitely variable transmission 34. If the pitch diameter of the two gears 31, 32 is identical, the mixing and kneading blades 27, 27' are driven at the same speed. If, as in the present embodiment, the mixing and kneading blades 27, 27' are constructed in a tangential manner, it may be appropriate to drive them at different circumferential speeds, i.e. different speeds for the same external diameter, in order to bring about an improved transverse mixing in the mixing chamber 4.

The mixing chamber 4 or one of its walls 5, 6 contains a thermometer probe 35 by means of which the temperature of treated charge in the mixing chamber can be measured.

Figure 3:
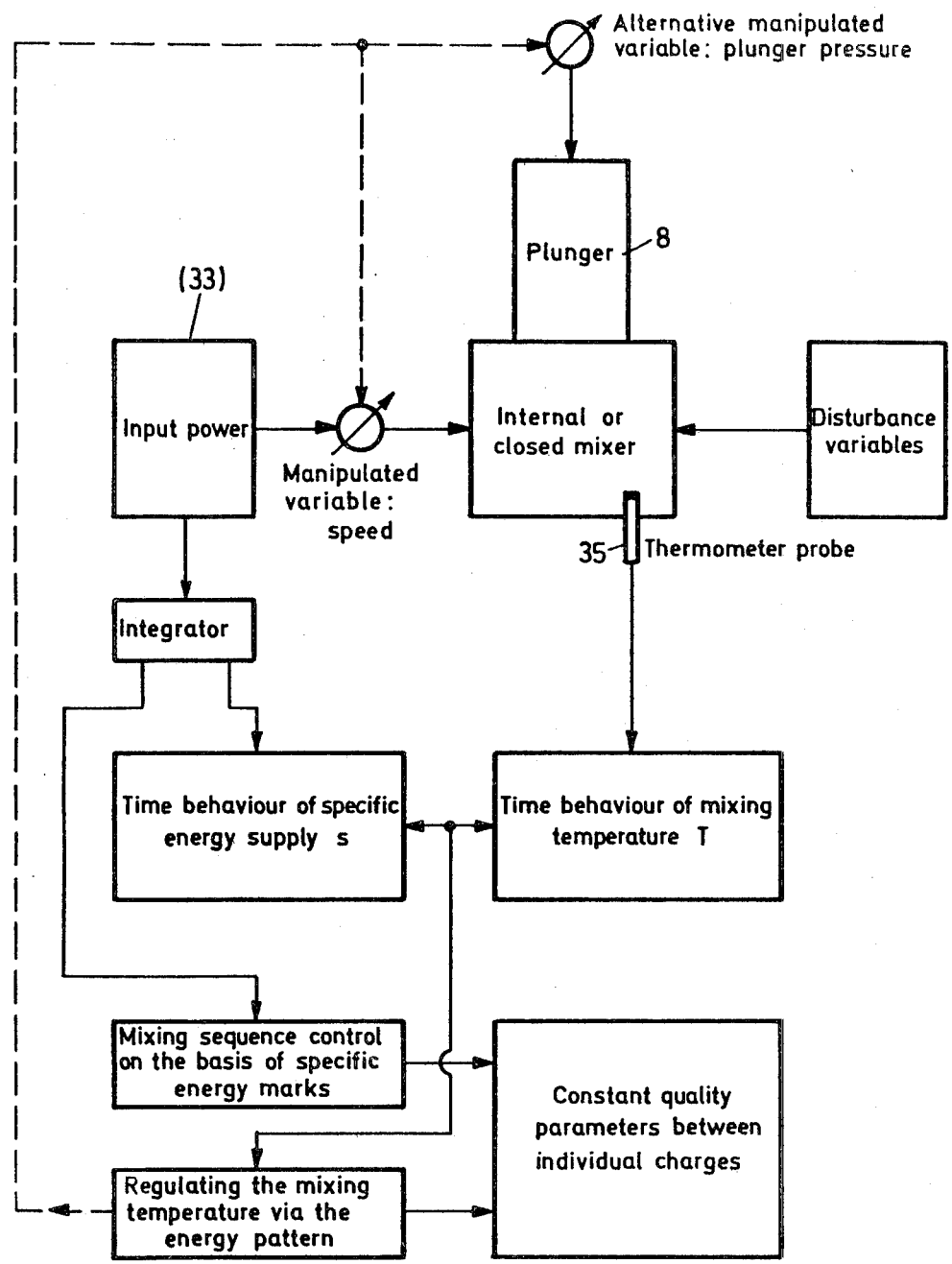
FIG. 3 is a regulation-control diagram for the internal mixer.

As can be understood from the control diagram of FIG. 3, during a batch type mixing process a number of disturbance variables come into action and have an effect on quality-determining process variables, namely the specific energy supply and the temperature of the material. These disturbance variables are, for example, variations in the machine temperature, cooling water temperature, charge supply temperature, plunger pressure, speed or filling level. The charge temperature is measured by means of the thermometer probe 35 and from this is determined the time behaviour of mixing temperature T. In parallel to this the power input of electric motor 33 is constantly determined in an integrator and from this the time behaviour of the specific energy supply s is established. The power input of the electric motor 33 can serve as a measure for the energy supplied to the charge, because the losses outside the mixer are either known or can be accurately determined in a conventional manner.

The integrator also continuously provides the integrated input power, i.e. the specific energy supplied to the charge, and is used for controlling the mixing sequence on the basis of the specific energy supplied to the charge. Thus, there is a control on the basis of energy marks, whereby on reaching a first energy mark, i.e. on reaching a predetermined supplied specific energy (energy per kilogram of weight), an additive e.g. carbon black in the case of Buna (rubber) is added as the charge and on reaching a second energy mark the plunger 8 is raised, whilst on reaching a third energy mark the hinged saddle 18 is opened and the charge ejected.

In combination therewith a regulation of the mixing temperature via the energy pattern is derived from the time behaviour of the specific energy supply and the time behaviour of the mixing temperature, either the speed or the plunger pressure serving as the manipulated variable. Regulation takes place by means of a desired/actual value comparison, the actual value being the aforementioned behaviour of the mixing temperature T over the specific energy supply s, whilst the desired value is determined in random manner by a so-called basic charge. In the case of a difference between the desired and actual values either the speed is adjusted as a manipulated variable or the plunger pressure is adjusted as an alternative manipulated variable. It is assumed in this connection that with rising speed or increasing plunger pressure the mixing material temperature rises more than the specific energy, whereas with decreasing speed or decreasing plunger pressure the mixing material temperature drops more than the specific energy.

As a result of this combination of the control of the mixing material sequence via the specific energy and the regulation of the mixing material temperature as a function of the energy pattern, these two essential quality parameters are kept approximately constant between charges.

For control and regulation purposes it is possible to use a microcomputer into which it is possible to feed, in any per se known manner, the energy marks and the desired temperature value behaviour over the specific energy supply.

Tests have shown that the quality-determining parameters are kept much more constant by this type of combined control and regulation. In the case of a disturbance variable effect, the variation in the quality-determining parameters is less than in the case of a control by energy marks only on the one hand, or a temperature regulation only on the other hand. It is admitted that the combined control and regulation leads to considerable mixing time variations, but this does not determine the quality. The specific energy supply determines the quality, because it is directly correlated with the filler dispersion quality and the processing viscosity. In turn, both determine the conventional test values (Mooney viscosity, tensile strength, modulus). The overall temperature behaviour over the specific energy supply also determines the quality, because it determines the chemical chain degradation, the threshold viscosity for incorporating plasticizers, the degree of scorching with cross-linking chemicals and the material damage resulting from excessive temperatures.

Figure 4:
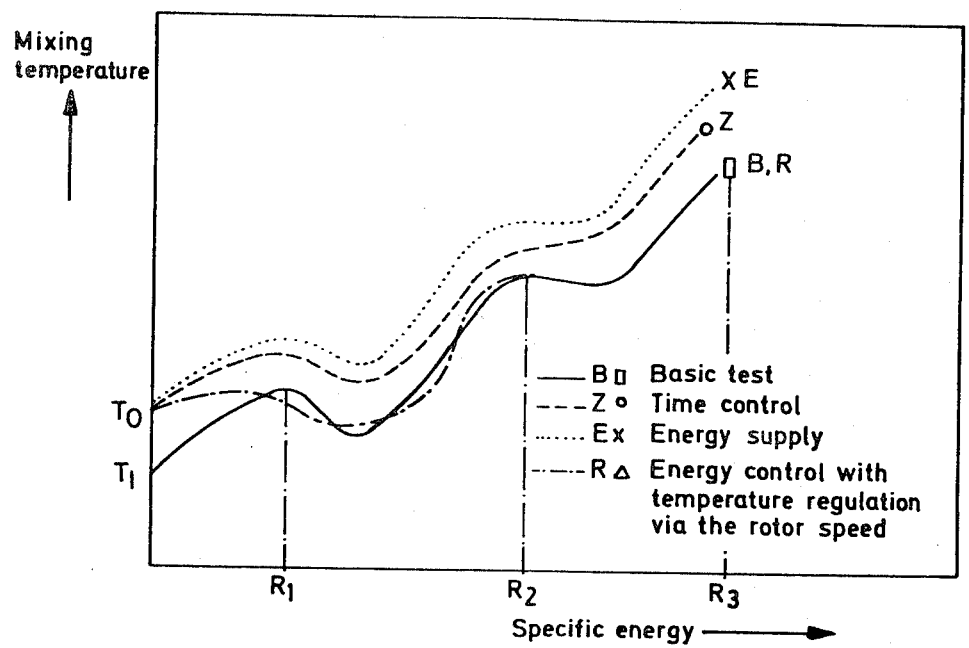
FIG. 4 is a comparison diagram for the mixing temperature via the specific energy supplied.

In FIG. 4 the mixing temperature is plotted over the specific energy supplied for different process performance procedures, the influence of a higher charge additional temperature, e.g. in summer being present as a disturbance variable. The continuous curve line B reproduces a basic test forming the desired value. This basic test was performed at a starting temperature $T_0$, e.g. in winter. In operation the charges are now supplied at a higher temperature $T_1$, e.g. in summer. When only a time control is used, as indicated in FIG. 4 by the broken line Z, the temperature constantly remains above the base curve B. The actual temperature is consequently continuously higher than corresponding to the desired value configuration and the specific energy supply is smaller due to the lower viscosity.

If only the energy supply is controlled, as indicated by the dotted line Ex in FIG. 4 a constant energy level is maintained, but the temperature varies even more compared with the desired value configuration than with a time control. However, the inventive combination of energy control with temperature follower control, e.g. via a speed control, leads to the mixed line (dot-dash) curve R in which the mixing temperature very rapidly and accurately approaches the desired value B.

The mixing temperature behaviour over the specific energy supplied in accordance with FIG. 4 also occurs with a control by energy marks when an additive, e.g. carbon black, is added at the first maximum of the basic curve $R_1$ and when at the second maximum $R_2$ the plunger is e.g. raised. At the end $R_3$ the hinged saddle 18 is, for example, opened.

The foregoing description of the specific embodiment(s) will so fully reveal the general nature of the invention that others can, by applying current knowledge, readily modify and/or adapt for various applications such specific embodiment(s) without departing from the generic concept, and, therefore, such adaptations and modifications should and are intended to be comprehended within the meaning and range or equivalents of the disclosed embodiment(s). It is to be understood that the phraseology or terminology employed herein is for the purpose of description and not of limitation.

It is to be understood that the invention is not limited to the embodiments disclosed which are illustratively offered and that modifications may be made without departing from the invention.

What is claimed is:

1. A method for controlling the mixing of rubber mixtures in a closed mixer, said mixer including feed and mixing blades disposed in a mixing chamber and means to drive said blades in opposite directions and at variable speeds, said mixer further including pressure-actuated plunger means and means for regulating the temperature of the mixing in the mixing chamber, comprising the steps of:

using a curve of desired values correlating mixing temperature to the specific energy supplied to the mixture in said mixer;
   integrating the energy provided to said motor over the total process time to determine the specific energy supplied to the mixture in said mixer;
   measuring the actual value of the temperature of the mixture in said mixer;
   comparing the measured temperature and the energy supplied during the mixing process time with the point on said curve of desired values corresponding thereto; and
   controlling at least one of the speed of rotation of said blades and the pressure of said pressure-actuated plunger based on said comparing step.

2. The method of claim 1 utilizing the results of said comparison step of said measured values of said mixing temperature and said specific energy compared to said curve of desired values to change operating conditions of the process such as the introduction of additives, controlling the motion of said pressure-actuated plunger, and completing the mixing process in said mixer.

3. A closed mixer for rubber mixtures, said mixer including feed and mixing blades disposed in a mixing chamber and drive motor means to drive said blades in opposite directions and at variable speeds, said mixer further including pressure-actuated plunger means and means for regulating the temperature of the mixing going on in the mixing chamber, the combination comprising:

means for using a curve of desired values correlating mixing temperature to the specific energy supplied to the mixture in said mixer;
   means for integrating the energy provided to said motor over the total process time to determine the specific energy supplied to the mixture in said mixer;
   means for measuring the actual value of the temperature of the mixture in said mixer;
   means for comparing the measured temperature and the energy supplied during the mixing process time with the point on said curve of desired values corresponding thereto, and
   means for controlling at least one of the speed of rotation of said blades and the pressure of said pressure-actuated plunger.

4. The combination of claim 3, means to change operating conditions of the process such as the introduction of additives, controlling the motion of said pressure-actuated plunger, and completing the mixing process in said mixer based on the output of said comparison means.

* * * * *